US011360732B1

(12) United States Patent
Dagani et al.

(10) Patent No.: US 11,360,732 B1
(45) Date of Patent: Jun. 14, 2022

(54) METHOD AND APPARATUS FOR DISPLAYING MULTIPLE DEVICES ON SHARED SCREEN

(71) Applicant: Samsung Electronics Co., Ltd., Suwon-si (KR)

(72) Inventors: Gabriel T. Dagani, Austin, TX (US); David C. Tannenbaum, Austin, TX (US); Christopher P. Frascati, Liberty Hill, TX (US); Michael Phillip, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/209,209

(22) Filed: Mar. 22, 2021

Related U.S. Application Data

(60) Provisional application No. 63/133,215, filed on Dec. 31, 2020.

(51) Int. Cl.
*G09G 3/20* (2006.01)
*G06F 3/14* (2006.01)

(52) U.S. Cl.
CPC .............. *G06F 3/1454* (2013.01); *G06F 3/14* (2013.01); *G06F 3/1438* (2013.01); *G09G 3/20* (2013.01);
(Continued)

(58) Field of Classification Search
CPC ...... G06F 3/1446; G06F 3/1431; G06F 3/167; G06F 3/0482; G06F 3/04883; G06F 9/452; G06F 3/1454; G06F 3/1438; G09G 2360/04; G09G 2356/00; G09G 2300/026; G09G 5/399; G09G 2370/022; G09G 2370/16; G09G 2370/06; G09G 2370/025; G09G 3/20; G09G 2360/12; G09G 2370/20; H04L 67/38; H04L 67/104; H04L 65/608; H04L 67/10; H04L 65/4015; H04L 65/80; H04M 1/72412; H04M 1/72403; H04N 21/41407; H04N 21/43076; H04N 21/632; H04W 4/06
See application file for complete search history.

(56) References Cited

U.S. PATENT DOCUMENTS

9,298,362 B2 * 3/2016 Lucero ............. H04N 21/41407
9,961,295 B2 * 5/2018 Takada ................. H04N 21/812
(Continued)

*Primary Examiner* — Vijay Shankar
(74) *Attorney, Agent, or Firm* — Renaissance IP Law Group LLP (57) ABSTRACT

A system and method is disclosed that allows multiple casting devices to work together to populate a large display screen according to the subject matter disclosed herein. The system includes a receiving device that includes two or more screen-cast receivers and a controller. Each screen-cast receiver receives from a corresponding casting device at least a portion of a frame of original content of the corresponding casting device generated in a native resolution of the corresponding casting device. The controller synchronizes each received portion of the frame of the original content of the corresponding casting device to form a video output signal that comprises a combination of each received portion, in addition to any internally generated content derived by the receiving display. A casting device may be a smartphone, a tablet, or a computing device, such as a laptop computer.

20 Claims, 5 Drawing Sheets

(52) U.S. Cl.
CPC ..... *G09G 2360/12* (2013.01); *G09G 2370/06* (2013.01); *G09G 2370/16* (2013.01); *G09G 2370/20* (2013.01)

(56) References Cited

U.S. PATENT DOCUMENTS

| | | | |
|---|---|---|---|
| 10,459,625 B2 * | 10/2019 | Seo | G06F 1/1616 |
| 10,607,571 B2 * | 3/2020 | Utsch | G06F 3/1446 |
| 2015/0084837 A1 * | 3/2015 | Mese | G06F 3/1446 |
| | | | 345/1.3 |
| 2015/0295783 A1 | 10/2015 | Glazer et al. | |
| 2015/0371607 A1 | 12/2015 | Holland et al. | |
| 2017/0344330 A1 * | 11/2017 | Masumoto | G06F 3/1431 |
| 2019/0051268 A1 * | 2/2019 | Utsch | G09G 5/12 |
| 2020/0304841 A1 | 9/2020 | Chang et al. | |

\* cited by examiner

METHOD AND APPARATUS FOR DISPLAYING MULTIPLE DEVICES ON SHARED SCREEN

CROSS-REFERENCE TO RELATED APPLICATION

This application claims the priority benefit under 35 U.S.C. § 119(e) of U.S. Provisional Application No. 63/133,215, filed on Dec. 31, 2020, the disclosure of which is incorporated herein by reference in its entirety.

TECHNICAL FIELD

The subject matter disclosed herein relates to displaying content on a display. More particularly, the subject matter disclosed here relates to a system and method for displaying content on a display being used by multiple devices.

BACKGROUND

The sizes and resolutions of screen displays are continuing to become larger every year. Resolutions of 4K and 8K use a content throughput that may be particularly difficult to generate without using image scaling or reducing framerate. With respect to video games in which features are rendered in real-time, native 4K-8K video resolution may use top of the line compute and graphics hardware; and even with such hardware, features may be scaled back to obtain agreeable framerates of at least 30-60 frames per second (FPS).

One popular approach for displaying content on large LCD or LED panels (e.g., televisions) is to use a method of wireless screen sharing. Wireless screen sharing involves the content of a portable computer, tablet, or phone being cast to a screen buffer of the television and displayed with a limited delay of 1-2 frames. For shared videos and video games, this approach allows a content that would be viewed on a portable device (having a 6"-15" screen) to have a better viewing experience on a larger display (e.g., a 60"-100" screen).

SUMMARY

An example embodiment provides a receiver device that may include two or more screen-cast receivers and a controller. The two or more screen-cast receivers may each receive from a corresponding casting device at least a portion of a frame of original content generated by the corresponding casting device. The controller may synchronize each received portion of the frame of original content generated by the corresponding casting device to form a video output signal that includes a combination of each received portion. The video output signal may be output to a display. In one embodiment, at least one casting device may be one of a smartphone, a tablet, and a computing device. In another embodiment, at least one screen-cast receiver receives the portion of the frame from the corresponding casting device over a local wireless communication link. The receiver device may further include a frame buffer that receives from a corresponding screen-cast receiver each received portion of the frame of original content of the corresponding casting device, and the controller may be configured to combine each respective portion of the frame of original content in the frame buffer to form the video output signal. In one embodiment, the receiver device may include a communication interface device that is configured to receive at least a portion of a frame of original content, and the receiver device may be configured to generate at least a portion of a frame of original content. The frame buffer may be configured to receive a portion of the frame of original content from one of a casting device, the communication interface and the receiver device, and the controller may be configured to synchronize each respective portion of the frame received in the frame buffer to form the video output signal. In one embodiment, each respective portion of a frame received from a casting device may include a complete frame of original content, and the controller may be configured to synchronize each respective complete frame received from a casting device to form the video output signal to be a sequence of complete frames. In still another embodiment, each respective portion of a frame received from a casting device may include a complete frame of original content, and the controller may be configured to synchronize each respective complete frame received from a casting device to form the video output signal comprising each respective complete frame received from a casting device, and adjust a layout of received portions of frames of original content in the video output signal based on one of one or more portions of frames not being received by a corresponding screen-cast receiver and a user configuration.

An example embodiment provides a casting device that may include an image-generating unit and an output device. The image-generating unit may generate at least a portion of a frame of original content of the casting device, and the output device may output the portion of the frame of original content of the casting device to a receiver device over a communication network. The casting device may be one of a smartphone, a tablet, and a computing device. In one embodiment, a receiving device may include two or more screen-casting receivers and a controller. The two or more screen-cast receivers that each receive from a corresponding casting device a portion of a frame of original content generated by the corresponding casting device, and the controller may synchronize each received portion of the frame of original content of the corresponding casting device to form a video output signal that comprises a combination of each received portion. The video output signal may be output to a display, and the communication network may include a local wireless communication network. In one embodiment, the receiving device may further include a frame buffer that receives from a corresponding screen-cast receiver each received portion of the frame of original content from the corresponding casting device. The controller may be configured to combine each respective portion of the frame of original content in the frame buffer to form the video output signal. Each respective portion of a frame received from a casting device may include a complete frame of original content, and the controller may be configured to synchronize each respective complete frame received from a casting device to form the video output signal to be a sequence of complete frames. In one embodiment, each respective portion of a frame received from a casting device may include a complete frame of original content, and the controller may be configured to synchronize each respective complete frame received from a casting device to form the video output signal comprising each respective complete frame received from a casting device.

An example embodiment provides A method that may include: receiving over a local wireless communication link by each of two or more screen-cast receivers from a corresponding casting device at least a portion of a frame of original content generated by the corresponding casting device; and synchronizing each respective portion of the frame of original content to form a video output signal. The video output signal may be output to a display, and at least one casting device may be one of a smartphone, a tablet, and a computing device. In one embodiment, each respective portion of a frame received from a casting device may include a complete frame of original content, and synchronizing each respective portion of the frame of original content may include selecting each respective complete frame of original content to form a video output signal comprising a sequence of complete frames. In another embodiment, each respective portion of a frame received from a casting device may include a complete frame of original content, and synchronizing each respective portion of the frame of original content may include synchronizing respective complete frames received from a casting device to form the video output signal comprising each respective complete frame received from a casting device. In one embodiment, the method may further include adjusting a layout of received portions of frames of original content in the video output signal based on one or more portions of frames not being received by a corresponding screen-cast receiver.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein relates to a system and a method that allows multiple casting devices, such as, but not limited to smartphones, tablets, laptop computers, and other similar portable computing devices, to work together to generate content to populate a "large" display screen. As used herein, a "large" display screen means a display that is larger or otherwise has one or more aspects that make it desirable to view rather than a portable device. Example aspects that may make a large display screen more desirable to view may include, but are not limited to, a higher resolution, a more vibrant color, a better view angle, and a larger physical size. In one embodiment, the content generated by each casting device may be original content of the casting device that is related to, but different from, content that is generated by another casting device. For example, the original content of a casting device may be a point-of-view (POV) of the casting device of a video game. Each casting device involved with the video game generates original content that reflects the POV of the casting device, but is different from the POVs of the other casting devices. The different generated original contents may be combined at a receiver device and used to populate a large screen. Another example of original content that is related to, but different from, original content of other casting device may be different sporting events, such as, but not limited to, different football games, different baseball games, different basketball games. etc. In another embodiment, the original content generated by each respective casting device may be independent from original content generated by another casting device. The different independent original contents may be combined at a receiver device and used to populate a large screen.

Configurations may vary based on system/device features, but the underlying purpose is the same for each system: to increase the compute power available for generating a display by coordinating multiple casting devices to work together to draw a single screen. A system for performing the functionality disclosed herein may be divided, or distributed, between a receiver associated with a display screen and transceivers associated with corresponding casting devices. An advantage provided by the subject matter disclosed herein may include using multiple external computing devices to simulcast either rendered or video-based content on a display screen, thereby reducing a framerate requirement associated with each external computing device to provide an overall image quality in which multiple devices are contributing to the overall displayed content.

The subject matter disclosed herein provides that the display receives multiple distinct wireless streams simultaneously. In one embodiment, this may include a television (or monitor) having screencast capabilities that may accept multiple streaming feeds from casting devices simultaneously. Each casting device (e.g., a smartphone or similar) may include a transmitter that may cast video content to, for example, a television by a user selecting the TV screen name and using, for example, an extra number, tag, or label that indicates a particular destination portion of the screen for the content transmitted by the casting device. In one embodiment, hardware and/or software may be used to both receive and manage video streams onto the appropriate section of a display screen at the appropriate times. In another embodiment, software may be used to mix audio content of the multiple incoming streams.

One example embodiment provides multiple casting devices that render various overlays of the same game, in which case given a distinct blend ordering, game/video content overlays may be displayed using multiple devices, e.g., live football games with overlaid graphic content, or video games using multiple phones to draw three-dimensional (3D) vs two-dimensional (2D) overlay content onto a screen. Still another example embodiment provides that a three-dimensional stereoscopic system may use casting devices that are configured to generate left- and right-eye content.

Figure 1:
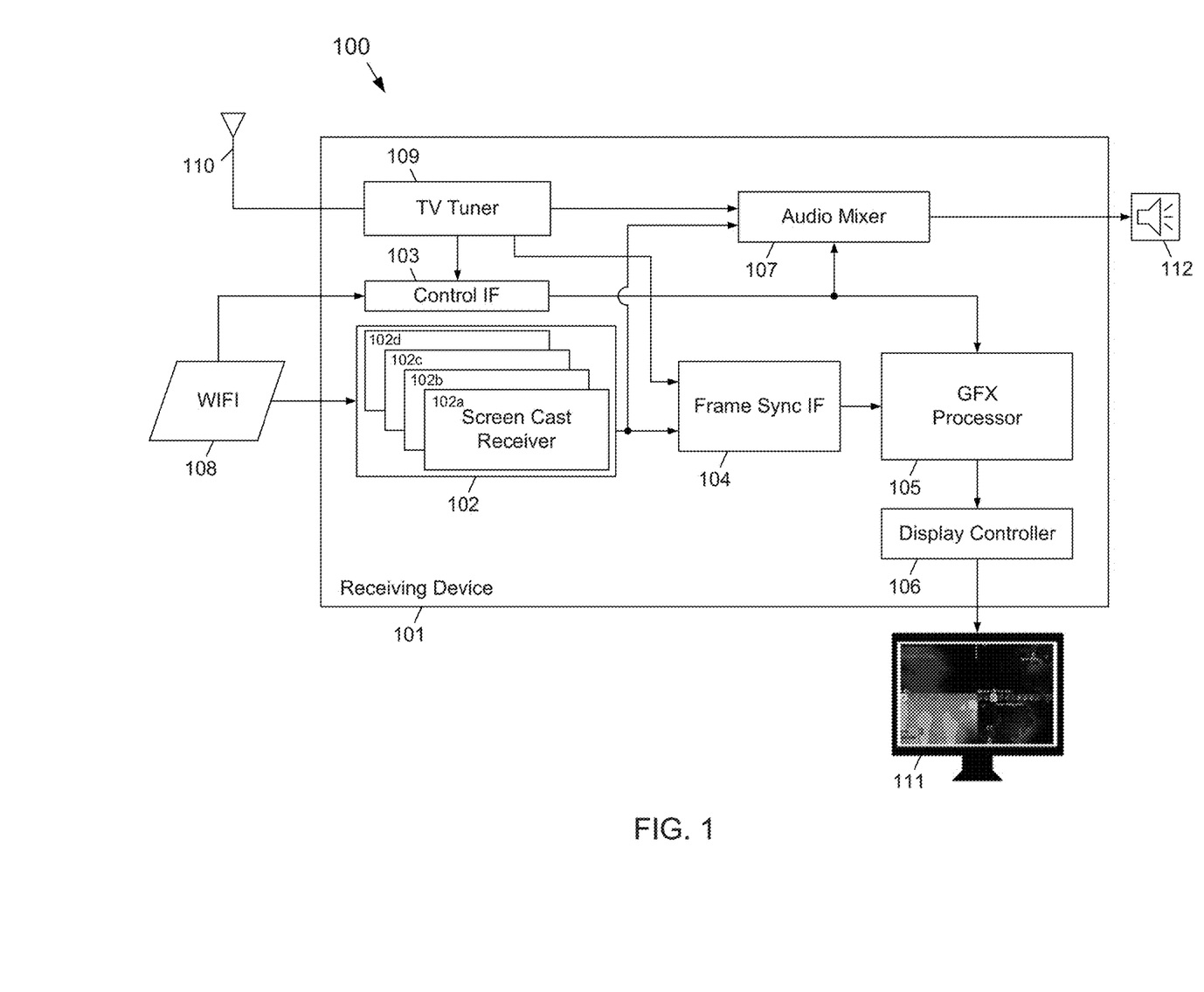
FIG. 1 depicts a first example embodiment of system that allows multiple casting devices to work together to populate a large display screen according to the subject matter disclosed herein.

FIG. 1 depicts a first example embodiment of system 100 that allows multiple casting devices to work together to populate a large display screen according to the subject matter disclosed herein. The system 100 may include a receiving device 101 that may include two or more screencast receivers 102*a*-102*n*, an intermediate frequency controller (control IF) 103, an intermediate frequency frame synchronizer (frame synch IF) 104, a graphic (GFX) processor 105, a display controller 106, and an audio mixer 107. In one embodiment, the receiving device 101 may include a WiFi receiver 108. Alternatively, the WiFi receiver 108 may be separate from the receiving device 101. In one embodiment, the WiFi receiver 108 may be embodied as part of a transceiver. In another embodiment, the receiving device 101 may include an optional television (TV) tuner (or communication interface device) 109 coupled to an antenna 110 and/or a CATV source (not shown). The television tuner

109 may also be coupled to the control IF 103, the frame synch IF 104, and the audio mixer 107. The various components and/or functional parts of the system 100 may be embodied as modules that may be any combination of software, firmware, and/or hardware configured to provide the various functionalities described herein. In one example embodiment, the system 100 may be configured as a USB stick-type device.

The WiFi receiver 108 may receive wireless communication signals over a local wireless network (or personal area network (PAN)) from two or more casting device transmitters (not shown) in a client-server type of arrangement. In one embodiment, the WiFi receiver 108 may downconvert the wireless communication signals to an intermediate frequency, which may then be input to the screen-cast receivers 102*a*-102*n*. The screen-cast receivers 102*a*-102*n* may each further demodulate/decode the received wireless communication signals from the client devices into corresponding baseband signals. The control IF 103 may receive control signals from the WiFi receiver 108 and generate additional control signals that may be used for synchronizing signals passing through the receiving device 101. In an alternative embodiment, the WiFi receiver 108 may demodulate/decode the received wireless communications signals and output a baseband signal, in which case the screen-cast receivers may provide further processing, such as error correction, to the baseband signals. In still another embodiment, the WiFi receiver 108 may be omitted and the screen-cast receivers 102*a*-102*n* may directly receive wireless communication signals from the client transceivers and demodulate/decode the signals to form baseband signals.

The respective video or image-content outputs of the screen-cast receivers 102*a*-102*n* may be input to the frame sync IF 104. Frame sync IF 104 may synchronize multiple 2D frame buffers by using a vertical sync (VSYNC) signal or pixel counting mechanism. In the case of a missing VSYNC (or insufficient data for stream) on one or more incoming streams, a prior frame may be repeated after a synchronization timer elapses (e.g., 60 Hz time window). Audio content may be input to the audio mixer 107. The GFX processor 105 may provide graphical processing functionality such as, but not limited to, translational functionality, rotational functionality, and/or scaling functionality, to the content in the frame sync IF 104 to generate a sequence of frames that are output to the display controller 106. The display controller 106 may output a video signal over a wired or a wireless link to a television or monitor 111.

The audio mixer 107 may output an audio signal to, for example, a speaker 112. Audio may either be mixed equally or unequally among all screencast streams. Mixing of the audio streams may be based on passive heuristics (e.g., volume), or alternatively active heuristics may take, for example, gameplay into account. Alternatively, volume may be provided from the display itself, or from the portable devices.

Figure 2:
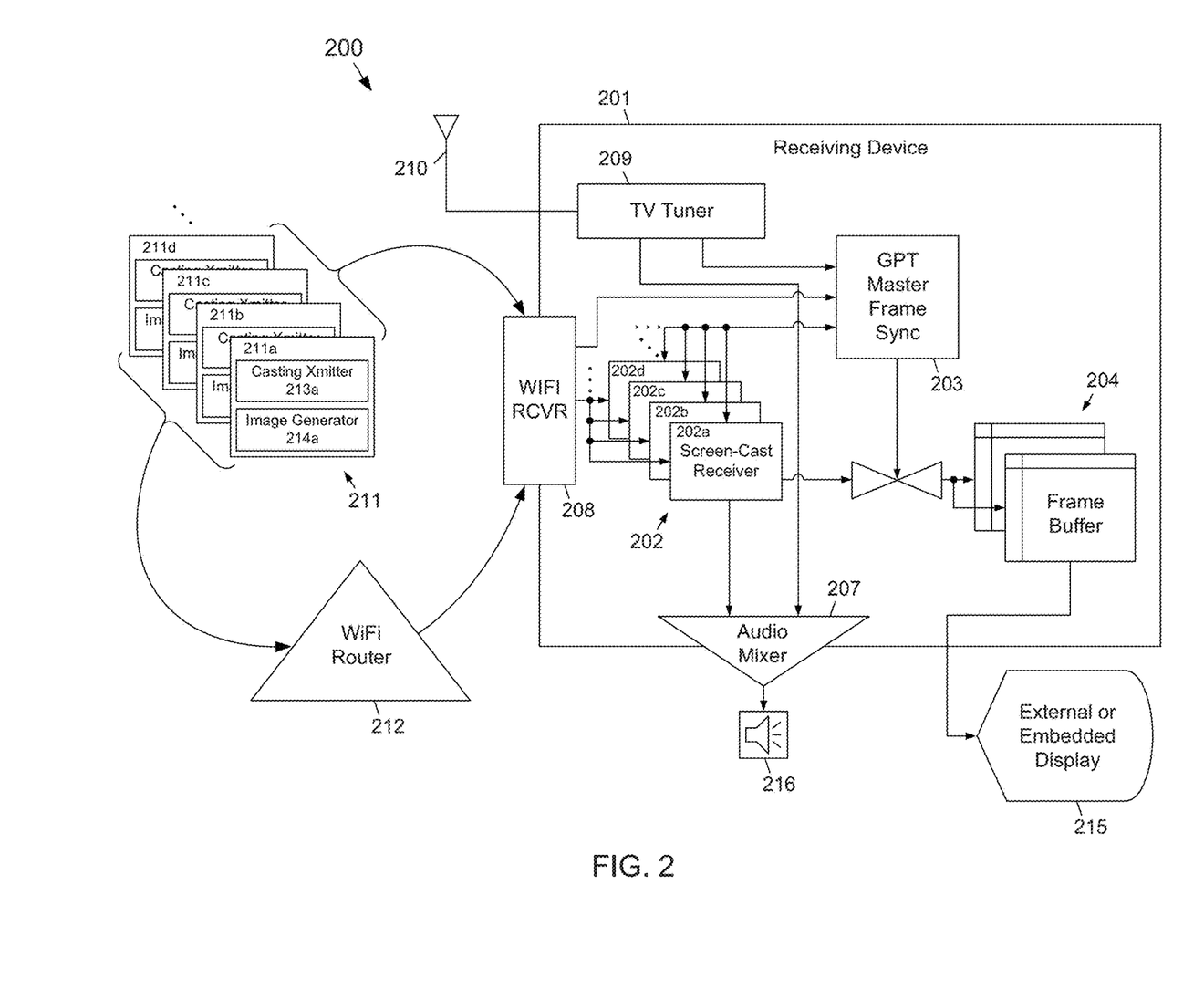
FIG. 2 depicts a second example embodiment of system that allows multiple casting devices to work together to populate a large display screen according to the subject matter disclosed herein.

FIG. 2 depicts a second example embodiment of a system 200 that allows multiple casting devices to work together to populate a large display screen according to the subject matter disclosed herein. The system 200 may include a receiving device 201 that may include two or more screen-cast receivers 202*a*-202*n*, a master frame sync controller 203, a frame buffer 204, an audio mixer 207 and a WiFi receiver 208. In one embodiment, the WiFi receiver 208 may be separate from the receiving device 201. In another embodiment, the WiFi receiver 208 may be embodied as part of a transceiver. In another embodiment, the receiving device 201 may include an optional television tuner (or communication interface device) 209 coupled to an antenna 210 and/or a CATV source (not shown). The television tuner 209 may also be coupled to the master frame sync controller 203 and the audio mixer 207. The various components and/or functional parts of the system 200 may be embodied as modules that may be any combination of software, firmware, and/or hardware configured to provide the various functionalities described herein. In one example embodiment, the system 200 may be configured as a USB or HDMI stick or dongle-type device.

The WiFi receiver 208 may receive wireless communication signals over a local wireless network (or PAN) from two or more casting devices 211*a*-211*n* directly (i.e., direct peer-to-peer) and/or through a WiFi router 212 in a client-server type of arrangement. A casting device 211 may include a casting transmitter (Xmitter) 213 and an image generating device 214. The image generating device 214 may be embodied as a graphics processing unit (GPU), a video processor, a display compositor, a camera interface and/or a pixel generating engine that generates at least a portion of a frame of original content. A casting device 211 may be, for example, a smartphone, a tablet, and/or a computing device, like but not limited to a laptop. A casting device 211 may duplicate an internal screen buffer and audio stream, and may send the contents of the screen buffer and audio stream wirelessly to the receiving device 201.

The WiFi receiver 208 may downconvert the wireless communication signals to an intermediate frequency and may be input to the screen-cast receivers 202*a*-202*n*. The screen-cast receivers 202 may each further demodulate/decode the received wireless communication signals from the client devices to form corresponding baseband signals. The master frame sync controller 203 may receive control signals from the WiFi receiver 208 and generate control signals that may be used for synchronizing signals passing through the receiving device 201. Additionally, the master frame sync controller 203 may be configured to combine content received from the different casting devices 211 based on a user selection.

The respective video or image content outputs of the screen-cast receivers 202*a*-202*n* and/or tuner 209 may be input to the frame buffer 204 based on how the master frame sync controller 203 has been configured to combine the content received from the different casting devices 211. Additionally, the receiver 201 may generate original content that is received by the frame buffer 204. In one embodiment, the master frame sync controller 203 may be configured in a mode that arranges the received content in a half-screen, a quadrant, or a region-type arrangement depending on the number of casting devices 211. If there are more than four casting devices 211 and the receiver device 201 includes a corresponding number of screen-cast receivers 202, the master frame sync controller 203 may arrange the received content so that each received content is displayed in a corresponding portion, or region, of a display 215. In one embodiment, if there are fewer casting devices 211 than the number of screen portions for which the master frame sync controller 203 has been configured, the master frame sync controller 203 may automatically adjust a layout of the content on the display screen 215 or, alternatively, leave the portion, or region, of the display screen 215 blank that has allocated for the missing content.

Audio content may be input to the audio mixer 207. The master frame sync controller 203 may control output of the frame buffer 204, which is sent (wired or wirelessly) to a display 209 that is external to the receiving device 201. Alternatively, the display 215 may be part of the receiving device 201. The audio mixer 207 may output an audio signal to, for example, a speaker 216.

Figure 3:
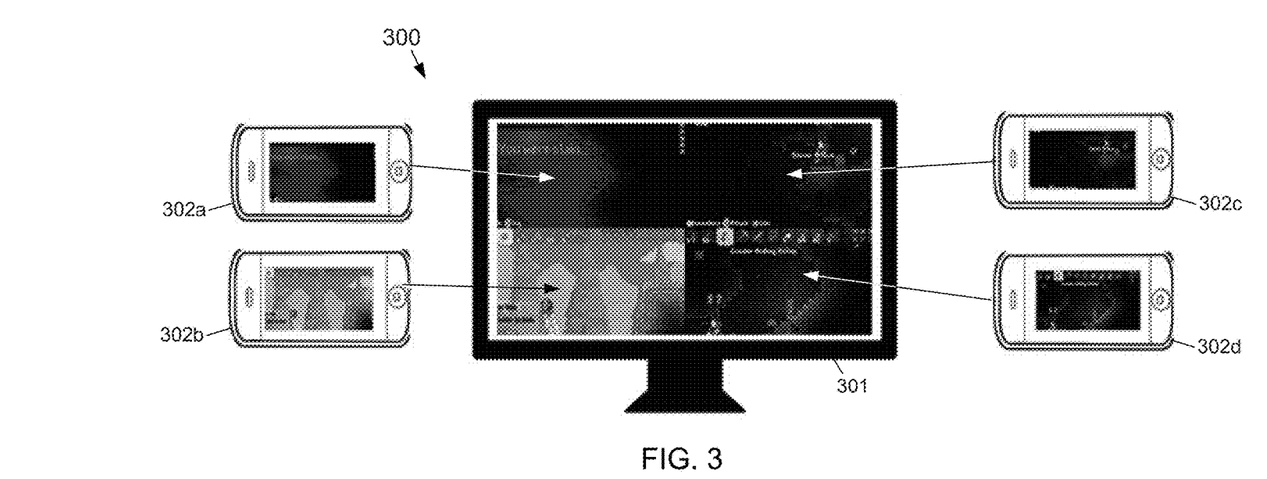
FIG. 3 depicts an example system that includes a receiving device and four example casting devices according to the subject matter disclosed herein.

FIG. 3 depicts an example system 300 that includes a receiving device 301 and four example casting devices 302*a*-302*d*. The receiving device 301 may be embodied as a television receiver that includes the receiving device, such as receiving device 101 or 201, respectively depicted in FIGS. 1 and 2. Alternatively, the receiving device may be separate from a television receiver. The receiving device 301 has been, for example, configured to display the original content of each of the casting devices 302 in separate quadrants of a display screen of the receiving device 301. That is, the original content of the casting device 302*a* is displayed in an upper left quadrant 303*a* of the display screen. The original content of the casting device 302*b* is displayed in a lower left quadrant 303*b* of the display screen. Similarly, the original content of the casting device 302*c* is displayed in an upper right quadrant 303*c* of the display screen, and the original content of casting device 302*d* is displayed in a lower right quadrant 303*d*. Each casting device may generate its original content in a resolution of the casting device, which is communicated to the receiving device 301. Alternatively, each casting device may generate its original content in a resolution based, for example, on a resolution of the display screen of the receiving device 301. Although four example casting devices are shown in FIG. 3, it should be understood that the receiving device 301 may be configured to receive content from two or more casting devices 302 and be configured to display the received content on the screen of the receiving device 301.

As depicted in FIG. 3, the original content that is displayed on the display of the receiving device 301 provides multiple perspectives, which may be used for displaying a multi-user game. In another embodiment, fewer than or more than four casting devices 302 may be used in which case the layout of the display of the receiving device 301 may be automatically adjusted to display the original content of each of the casting devices 302 in separate portions or regions of the display. Synchronization may be provided either by using the receiving device 301 as a timekeeper or allowing the casting devices 302 to selectively originate a timekeeper for synchronizing among all casting devices 302. Audio may be mixed together, or muted at the receiving device 301 with the intention of each casting device using its own audio for a specific viewer with or without headphones.

Game context may be maintained either by a single casting device or an external server. A client-side prediction may be used for games in which the game may artificially assume the whereabouts of players until sync time and then update player positions. If two or more players are within a threshold vicinity, updates may be performed at relatively shorter intervals, which may improve pure client-server synchronization latency. A client-side prediction approach may provide that synchronization may be delayed by an application until player interaction has exceeded a threshold.

Figure 4:
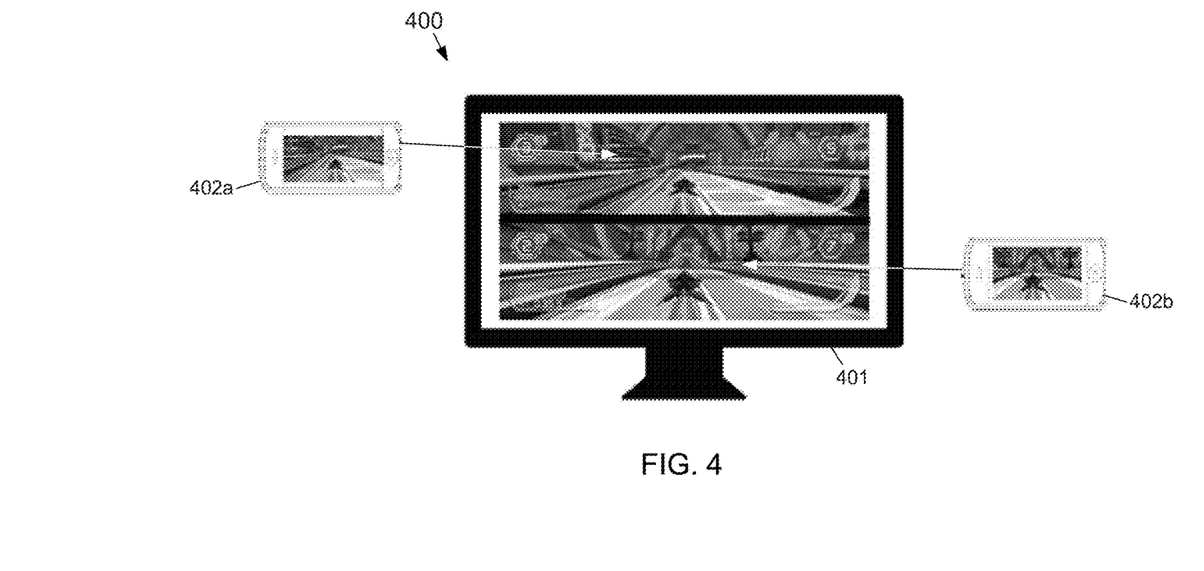
FIG. 4 depicts an example system that includes a receiving device and two example casting devices according to the subject matter disclosed herein.

FIG. 4 depicts an example system 400 that includes a receiving device 401 and two example casting devices 402*a* and 402*b*. The receiving device 401 may be embodied as a television receiver that includes the receiving device, such as receiving device 101 or 201. The receiving device 401 has been, for example, configured to display the original content of each casting device 402 in separate horizontal portions, or regions, of a split-screen display. Alternatively, separate vertical portions may be used for a split-screen display. Although simple rectangular regions are shown for screen splitting, other (non-rectangular) geometries can be readily contemplated in which one device is partially overlayed over or around another device's space, via masking concepts. Additionally, although two example casting devices are shown in FIG. 4, it should be understood that the receiving device 401 may be configured to receive content from two or more casting devices 402 and be configured to display the received content on the screen of the receiving device 401.

Another alternative system mode may include two or more casting devices that each cast completely different content in a resolution in a half or quadrant of a large display, for example, four separate live football games, or four different video game matches. This system mode may allow a "party mode" for a television or large screen by allowing more than one casting device to cast content independently onto a display screen with no synchronization involved. For this mode, the volume of all four channels might be audio mixed or filtered to allow audio channels at a time depending on a desired output. A special mode may be provided that allows one of the received streams to take over the display screen for a limited time (e.g., a winner screen or a common transition movie that is relevant to all users). Also another embodiment may include an internal video stream monitor/TV sourced data to be downscaled and streamed into a portion of the screen in the stead of an external screen-casted stream.

To avoid screen-tearing (e.g., when some frames of devices are complete while others are still being generated), there may be per quadrant (or display area) updates if the screen allows, or a reduced framerate to allow for all quadrants to complete in a given interval. In situations in which any of the many casting devices may be interrupted, there an application-level response provides that the application pauses the game/video for all, removes the interrupted party, or has an artificial intelligence (AI) feature take over for the interruption.

Figure 5:
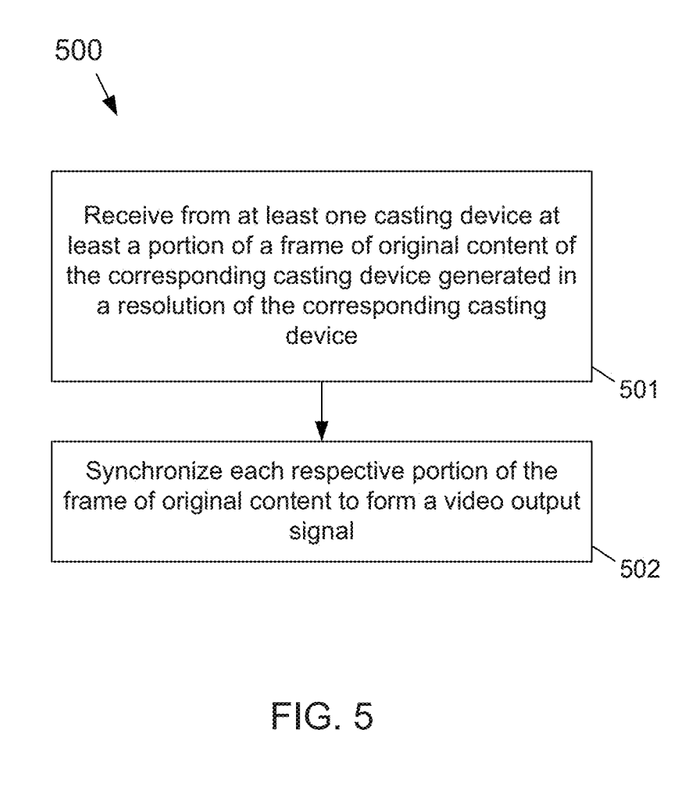
FIG. 5 is a flowchart of an example method for multiple casting devices to work together to populate a large display screen according to the subject matter disclosed herein.

FIG. 5 is a flowchart of an example method 500 for multiple casting devices to work together to populate a large display screen according to the subject matter disclosed herein. At 501, at least one screen-cast receiver of a receiving device may receive at least a portion of a frame of original content from a corresponding casting device over a local wireless communication link in which the original content is generated in a resolution of a corresponding casting device. Normally, multiple screen-cast receivers would be receiving a corresponding portion of a frame of original content from a corresponding casting device, however, if, for some reason, all but one communication link from a casting device end, the display screen coupled to the receiving device will logically fallback to using the single remaining casting device. At 502, each respective portion of the frame of original content is synchronized to form a video output signal.

Figure 6:
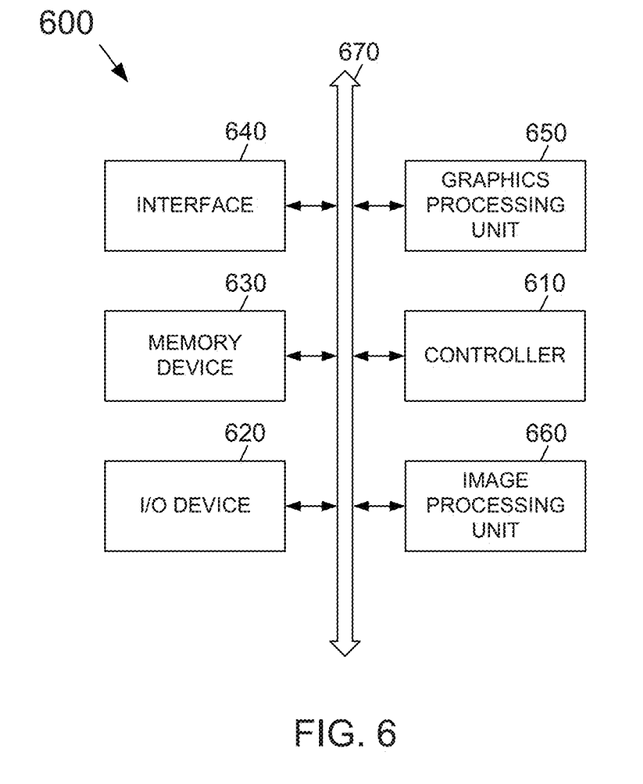
FIG. 6 depicts an electronic device that includes a receiving device that receives original content from multiple casting devices and operates to combine the different original contents to populate a large display screen according to the subject matter disclosed herein.

FIG. 6 depicts an electronic device 600 that includes a receiving device that receives original content from multiple casting devices and operates to combine the different original contents to populate a large display screen according to the subject matter disclosed herein. As used herein, a "large" display screen means a display that is larger or otherwise has one or more aspects that make it desirable to view rather than a portable device. Example aspects that may make a large display screen more desirable to view may include, but is not limited to, a higher resolution, a more vibrant color, a better view angle, and a larger physical size. In one embodiment, the electronic device 600 may be embodied as a television receiver that may be configured as a receiving device, such as receiving device 101 or 201, respectively depicted in FIGS. 1 and 2.

The electronic device 600 may include a controller 610, an input/output device 620 such as, but not limited to, a keypad, a keyboard, a display, a touch-screen display, a camera, and/or an image sensor, a memory 630, an interface 640, a GPU 650, and an imaging-processing unit 660 that are coupled to each other through a bus 670. The controller 610 may include, for example, at least one microprocessor, at least one digital signal processor, at least one microcontroller, or the like. The memory 630 may be configured to store a command code to be used by the controller 610 or a user data.

Electronic device 600 and the various system components of electronic device 600 may include the image processing unit 660. The interface 640 may be configured to include a wireless interface that is configured to transmit data to or receive data from a wireless communication network using a RF signal. The wireless interface 640 may include, for example, an antenna. The electronic system 600 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A casting device, comprising:
    an image-generating unit that generates a portion of a frame of original content of the casting device, the portion of the frame of being less than an entirety of the frame and to be combined with other portions of the frame generated by at least one other casting device to form a video signal that comprises a combination of each received portion; and
    an output device that outputs the portion of the frame of original content of the casting device to a receiver device over a communication network, the receiver device including two or more screen-cast receivers.

2. The casting device of claim 1, wherein the casting device comprises a smartphone, a tablet, or a computing device.

3. The casting device of claim 1, further comprising the receiving device, the receiving device comprising:
    the two or more screen-cast receivers, each screen-casting device receiving from a corresponding separate casting device a portion of a frame of original content generated by the corresponding separate casting device; and
a controller that synchronizes each received portion of the frame of original content generated by separate casting devices to form a video output signal that comprises the combination of each received portion.

4. The casting device of claim 3, wherein the video output signal is output to a display, and
wherein the communication network comprises a local wireless communication network.

5. The casting device of claim 3, wherein the receiving device further comprises a frame buffer that receives from each screen-cast receiver a corresponding portion of the frame of original content from the casting device,
wherein the controller is configured to combine each respective portion of the frame of original content in the frame buffer to form the video output signal.

6. The casting device of claim 3, wherein each respective portion of a frame received from a casting device comprises a complete frame of original content, and
wherein the controller is configured to synchronize each respective complete frame received from a casting device to form the video output signal to be a sequence of complete frames.

7. The casting device of claim 3, wherein each respective portion of a frame received from a casting device comprises a complete frame of original content, and
wherein the controller is configured to synchronize each respective complete frame received from a casting device to form the video output signal.

8. A receiver device, comprising:
two or more screen-cast receivers that each receive from a corresponding separate casting device at least a portion of a frame of original content generated by the corresponding separate casting device; and
a controller that synchronizes each received portion of the frame of original content generated by separate casting devices to form a video output signal that comprises a combination of each received portion.

9. The receiver device of claim 8, wherein the video output signal is output to a display.

10. The receiver device of claim 8, wherein at least one screen-cast receiver receives a corresponding portion of the frame from the corresponding separate casting device over a local wireless communication link.

11. The receiver device of claim 8, further comprising a frame buffer that receives from a corresponding screen-cast receiver each received portion of the frame of original content of the corresponding separate casting device,
wherein the controller is configured to combine each respective portion of the frame of original content in the frame buffer to form the video output signal.

12. The receiver device of claim 11, further comprising a communication interface device that is configured to receive at least a portion of a frame of original content,
wherein the receiver device is configured to generate at least a portion of a frame of original content,
wherein the frame buffer is configured to receive a portion of the frame of original content from one of a casting device, the communication interface device and the receiver device, and
wherein the controller is configured to synchronize each respective portion of the frame received in the frame buffer to form the video output signal.

13. The receiver device of claim 8, wherein at least one casting device comprises a smartphone, a tablet, or a computing device.

14. The receiver device of claim 8, wherein each respective portion of a frame received from a casting device comprises a complete frame of original content, and
wherein the controller is configured to synchronize each respective complete frame received from a casting device to form the video output signal to be a sequence of complete frames.

15. The receiver device of claim 8, wherein each respective portion of a frame received from a casting device comprises a complete frame of original content, and
wherein the controller is configured to:
synchronize each respective complete frame received from a casting device to form the video output signal comprising each respective complete frame received from a casting device, and
adjust a layout of received portions of frames of original content in the video output signal based on one of one or more portions of frames not being received by a corresponding screen-cast receiver and a user configuration.

16. A method, comprising:
receiving over a local wireless communication link by each of two or more screen-cast receivers, each screen-cast receiver receiving from a corresponding separate casting device at least a portion of a frame of original content generated by the corresponding separate casting device; and
synchronizing each respective portion of the frame of original content to form a video output signal.

17. The method of claim 16, wherein the video output signal is output to a display, and
wherein at least one casting device comprises a smartphone, a tablet, or a computing device.

18. The method of claim 16, wherein each respective portion of a frame received from a casting device comprises a complete frame of original content, and
wherein synchronizing each respective portion of the frame of original content comprises forming the video output signal to comprise a sequence of complete frames.

19. The method of claim 16, wherein each respective portion of a frame received from a casting device comprises a complete frame of original content, and
wherein synchronizing each respective portion of the frame of original content comprises forming the video output signal to comprise each respective complete frame received from a casting device.

20. The method of claim 16, further comprising adjusting a layout of received portions of frames of original content in the video output signal based on one or more portions of frames not being received by a corresponding screen-cast receiver.

* * * * *